Patented June 13, 1933

1,914,037

UNITED STATES PATENT OFFICE

FREDERICK H. NORTON, OF WINCHESTER, AND EARL R. PERSON, OF LEOMINSTER, MASSACHUSETTS ASSIGNORS TO DU PONT VISCOLOID COMPANY, INCORPORATED, OF WILMINGTON, DELAWARE, A CORPORATION OF DELAWARE

MOLDING PROCESS AND APPARATUS

Application filed June 8, 1931. Serial No. 542,730.

This invention relates to the molding and casting of various kinds of articles but is particularly adapted for producing the bronze dies in which hollow viscoloid and similar articles are made from sheet stock.

The principal object of the invention is to provide a practical method and means by which dies of this character, and other metal castings, can be made in a non-metallic mold and in such a way that the castings will fill the finest cavities in the mold and come out with a very sharp outline. Other objects of the invention are to provide a non-metallic mold, not only vented in a few spots but, vented sufficiently throughout its entire surface so that the air will all escape from the finest indentations in the mold, thus preserving the sharp outline above mentioned; to provide a mold structure which shall be of sufficient strength to stand the pressure of the molten metal, the shrinkage strains and the heat to which it is subjected and which will not warp when heated; to provide a mold formed of an inner layer of material thickness of a composition which will allow the air to escape from all areas of the mold surface within, surrounded by a more porous composition, preferably of greater thickness and, having metallic reinforcements principally for the purpose of keeping the two halves of the mold fixed solidly together; to provide a method of casting which involves the heating of such a mold to a comparatively high temperature and keeping it heated for the purpose of thoroughly baking the mold and driving off all moisture and casting when the mold is still heated and has been so heated for a period of time.

Other objects and advantages of the invention will appear hereinafter.

Reference is to be had to the accompanying drawing, in which

Figure 1:
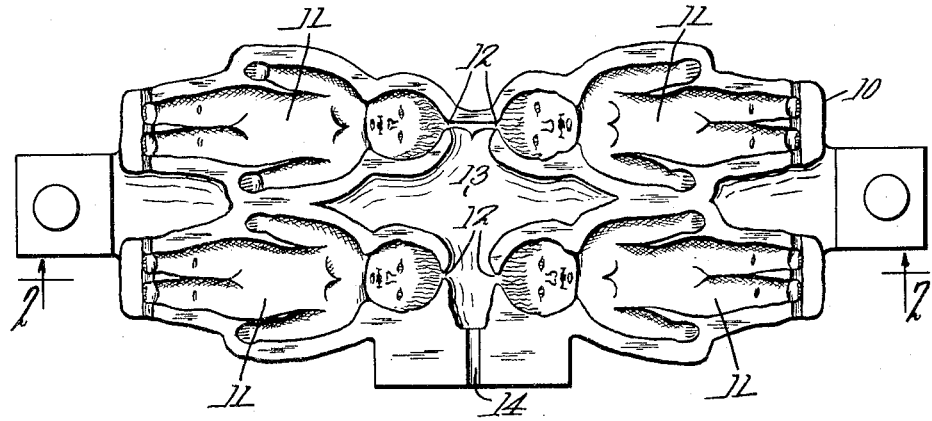
Fig. 1 is a face view of the inner surface of half a die constructed in accordance with this invention.
Figure 2:
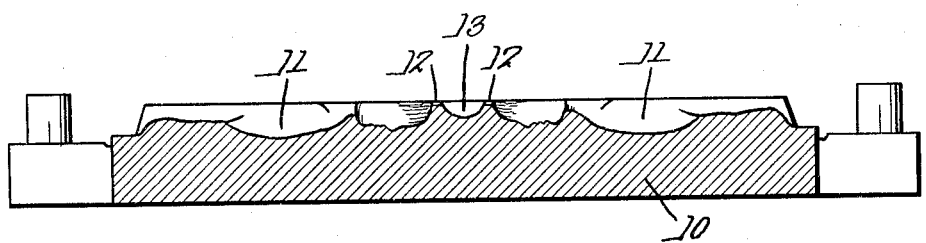
Fig. 2 is a sectional view on the line 2—2 of Fig. 1.

The die 10 shown in Figs. 1 and 2 is made of bronze and all the surfaces against which the pyroxylin is to come in contact have been cut out by hand. This can be done only by very skilled labor and at a very high expense. The process is called die sinking.

One of the objects of this invention is to provide a mold, produced from a pattern in which the carving is made on the pattern at a much lower price, and enabling the manufacturer to cast this bronze die at a material saving in cost because it is finished in the casting process. It makes no particular difference what the casting is that is to be produced. In the die 10 shown in the drawing, which is of course a half die, and which is supplemented by another half die like it or rather complementary to it, a plurality of die cavities 11 are shown. At the head end of each one of these is a small passage 12, and, of course, there is a chamber 13 all around the head ends of these figures extending in between them. At one end is a drilled opening 14. It is through this drilled opening that compressed air or other fluid is introduced into all the die cavities in the die to pass between the two sheets of viscoloid or other plastic material placed in these dies to press the plastic material firmly and equally all around into the surfaces that are carved out or cast in the dies. This is not a feature of this invention but is mentioned because we have employed this kind of a die for illustrating this invention. The problem is to produce this die with all the carvings showing plainly and accurately and thus avoiding the necessity of doing it by skilled hand work on these bronze or other metallic plates or dies.

Figure 3:
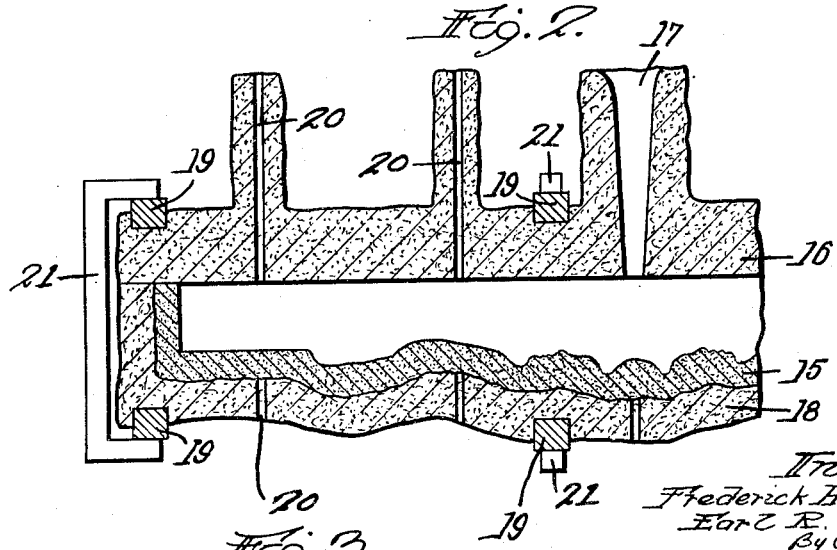
Fig. 3 is a sectional view, on the same plane as Fig. 2, of a mold constructed in accordance with this invention, with the pattern removed and ready for the die shown in Figs. 1 and 2 to be cast.

In Fig. 3 is shown a complete mold in which one die 10 is adapted to be cast. This mold consists of an upper and a lower part. In the first place it will be understood that a pattern of some material softer than the metal die is made and this pattern has to be carved one one side to provide a figure that is complementary to the die cavities 11 of Fig. 1. In the present case the pattern has projections thereon corresponding with the die cavities 11 and fully carved to show the various features of one side, of the doll or other article that is to be produced. This pattern, of course, represents half of this article, in the case being described, and is mounted on a plain surface. The pattern is not shown herein.

Around one side and the ends and edges of this pattern is molded a molding mixture of refractory and heat insulating materials of such a fine nature as to penetrate into the finest lines on the pattern and retain its shape when the pattern is withdrawn. This mixture is made, preferably, of a binder, as plaster of Paris, and a material called "Grog". This "Grog" is ground to a fine degree, preferably to pass through a 150 mesh per inch screen. It is mixed with the plaster of Paris in the proportions of about 40 percent by weight plaster of Paris and 60 percent "Grog". After being thoroughly mixed with water the composition is molded on one side of the pattern so as to form a mold part 15. This molding mixture which comes into contact with the surface of the pattern is of very fine grain, as has been stated, and also it is capable of setting to a hard state quickly without shrinking and taking an exact imprint of the finest lines on the pattern. This composition in a wet plastic state is spread over the pattern a quarter of an inch thick, more or less, and may be allowed to set to a sufficient extent so that it is hard and coherent.

The first mold part 15, either partially set or still in a plastic state, is then covered with a composition 18 of long fibred asbestos and a binder, preferably plaster of Paris, preferably in the proportion of two volumes of asbestos and three volumes of plaster of Paris. This composition is mixed up with water in the same way and applied quickly. In order to make the outer composition adhere better to the inner one, the latter may be scored on its outer surface before setting. This composition 18 is thicker than the other composition, preferably, and no particular attention has to be paid to the fineness of the ingredients. The outside composition of plaster of Paris and asbestos is formed of substantially uniform thickness.

The asbestos fibres are present throughout the plaster of Paris, the materials of the composition having been mixed thoroughly before application. Thus a half mold is produced consisting of two layers. The inner composition 15 is about one eighth to one quarter of an inch thick, according to the size of the casting, and is very fine so that it will receive the imprint of the pattern. Also on account of the use of the "Grog", even in a very fine state, it is porous at every point. The outside layer of the composition 18 is more porous and stronger. The asbestos fibres make it coarsely porous and allow any air coming to it from the inner mold wall 15 to escape.

After the mold is set the pattern is withdrawn, and the mold part united with an upper mold part 16 made of one layer only of asbestos and plaster of Paris and plain on the inside or bottom. This side of the casting is planed off, so it does not need to preserve any fine lines. Metal reinforcing bars 19 are partially embedded in the asbestos composition of both halves of the mold and connected by wires or clamps 21 to hold it together and prevent the two halves separating to allow the metal, when it is poured, to escape. The clamping is done also so that the mold will hold together in a perfect state when baked.

Now this mold is baked over a period of time, sometimes from four days to a week, according to the size of the casting, at a temperature of above 400° Fahrenheit in an oven adapted to heat the mold uniformly on all surfaces. The mold is kept at that temperature until it is time to pour the metal into it. The metal is poured into the mold at a temperature just above the melting point.

It is customary to get rid of air or steam produced in the ordinary mold by means of vents and in this case several vents 20 are shown, all raised above the mold part 16 to the same height as the pouring sprue 17. The main point, however, so far as the elimination of air and gases is concerned, is the provision of an inner composition, such as that mentioned herein, in contact with which the metal is to be cast, made up entirely of extremely fine particles and yet permeable. Thus the air and steam can escape through this inner mold 15. The outer composition 18 also is made so as to allow the air to escape and both compositions allow it to escape at all points so that there will be no bubbles of air or gas inside the mold when the metal begins to harden on the surface.

The heating or baking of the mold for the long period mentioned is primarily for the removing of all traces of moisture, including at least some of that chemically combined in the plaster, and thoroughly hardening both mold compositions is another, though minor, object of this baking. The pouring of the metal into the mold while still at its baking temperature is done, of course, so that no lowering of the temperature of the mold will enable it to absorb any moisture from the air and to prevent any chilling of the metal as it is poured. The mold is very weak also if allowed to cool.

This mold having once been used is thrown away in case it is employed for making such a die as the die 10, because one of these dies lasts a very long time and because, in spite of the nature of the mold, it is not very likely that it can be removed from the casting intact.

Although we have illustrated and described only one form of the invention and one procedure, we are aware of the fact that modifications can be made therein by any person skilled in the art without departing from the scope of the invention as expressed in the claims. Therefore, we do not wish to be limited in this respect but what we do claim is:—

1. The method of molding which consists in forming from a pattern a mold having an inner layer of refractory material, embedding the same in a composition of a more porous character and having greater tenacity, withdrawing the pattern, binding the separate parts of the mold in their proper relationship with each other, baking the said mold for a period of several days at a high temperature and casting the metal in the mold while still at substantially the same temperature.

2. The method of making a casting which consists in forming a mold having an inner layer of finely ground baked clay and plaster of paris, embedding the same in a composition of plaster of paris and asbestos, heating the said mold to a high temperature and casting the metal in the mold while heated.

3. A casting mold comprising an inner layer of substantially uniform thickness comprising baked clay ground up to an extreme degree of fineness and an outer contiguous layer comprising asbestos.

4. A casting mold comprising an inner layer of material of substantially uniform thickness, of a composition consisting of about 60 percent by weight of ground baked white clay and 40 percent plaster of paris and an outer contiguous layer consisting of about two fifths asbestos and three fifths plaster of paris, by volume.

5. A casting mold comprising an inner layer of a composition consisting of baked white clay ground up to an extreme degree of fineness and plaster of paris and having a surrounding body of asbestos and plaster of paris, and metal clamps surrounding the body of material to hold the parts of the mold together.

6. A baked mold of refractory material for casting metal having reinforced bars partially embedded in the outer surfaces thereof and means for holding said bars together.

7. A refractory casting mold of a plurality of parts, each part having a reinforcing bar immovably fixed thereto along its outer surface and clamps at both ends of the bars for holding the parts of the mold together.

8. The method of making a mold for a die for a blown article of plastic sheet material, which consists in making an inner layer, of the desired shape inside and of approximately uniform thickness, of finely ground material, placing on its outer side a layer of substantially uniform thickness of refractory material of coarser texture, baking the mold and casting the die while the mold is hot.

In testimony whereof we have hereunto affixed our signatures.

FREDERICK H. NORTON.
EARL R. PERSON.